United States Patent
Takada

(10) Patent No.: US 8,264,539 B2
(45) Date of Patent: Sep. 11, 2012

(54) VIDEO-RECORDING AND TRANSFER APPARATUS, AND VIDEO-RECORDING AND TRANSFER METHOD

(75) Inventor: Tomomi Takada, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 525 days.

(21) Appl. No.: 12/505,605

(22) Filed: Jul. 20, 2009

(65) Prior Publication Data
US 2010/0020175 A1  Jan. 28, 2010

(30) Foreign Application Priority Data
Jul. 24, 2008  (JP) ................................ 2008-191026

(51) Int. Cl.
 *H04N 7/18* (2006.01)
(52) U.S. Cl. ........................ 348/148; 348/143; 348/159
(58) Field of Classification Search .................. 348/148
 See application file for complete search history.

(56) References Cited

U.S. PATENT DOCUMENTS

| | | | |
|---|---|---|---|
| 2004/0008255 A1* | 1/2004 | Lewellen | 348/148 |
| 2004/0244055 A1 | 12/2004 | Takada et al. | |
| 2005/0076176 A1 | 4/2005 | Takada et al. | |
| 2006/0284978 A1* | 12/2006 | Girgensohn et al. | 348/143 |
| 2010/0002082 A1* | 1/2010 | Buehler et al. | 348/159 |
| 2011/0043631 A1* | 2/2011 | Marman et al. | 348/143 |

FOREIGN PATENT DOCUMENTS

| | | |
|---|---|---|
| JP | 2001292439 A | 10/2001 |
| JP | 2002-209193 | 7/2002 |
| JP | 2006086991 A | 3/2006 |
| JP | 2000341678 A | 12/2009 |

OTHER PUBLICATIONS

Official Action of JPO regarding JP 2008-191026, Apr. 10, 2010.

\* cited by examiner

*Primary Examiner* — Phuoc Nguyen
*Assistant Examiner* — June Sison
(74) *Attorney, Agent, or Firm* — Bacon & Thomas, PLLC

(57) ABSTRACT

An apparatus being mounted on a car of a train, video-recording video data from an internet protocol (IP) camera, and transferring the video data outside the car, comprises a network digital recorder (NDR) performing video-recording of the video data from the IP camera in a full-time, an archive-type NDR (A-NDR) reading the video-recorded video data from the NDR to record it, a communication device determining priority of a communication to and from the outside of the car to establish a communication path to and from a partner communication device in a communicable state, and a control device reading the recorded video data from the A-NDR to transfer the video data to the partner communication device via the communication path. The A-NDR ranks each item of the video data with importance, and the control device controls the video data so as to read it in descending order of ranking.

13 Claims, 10 Drawing Sheets

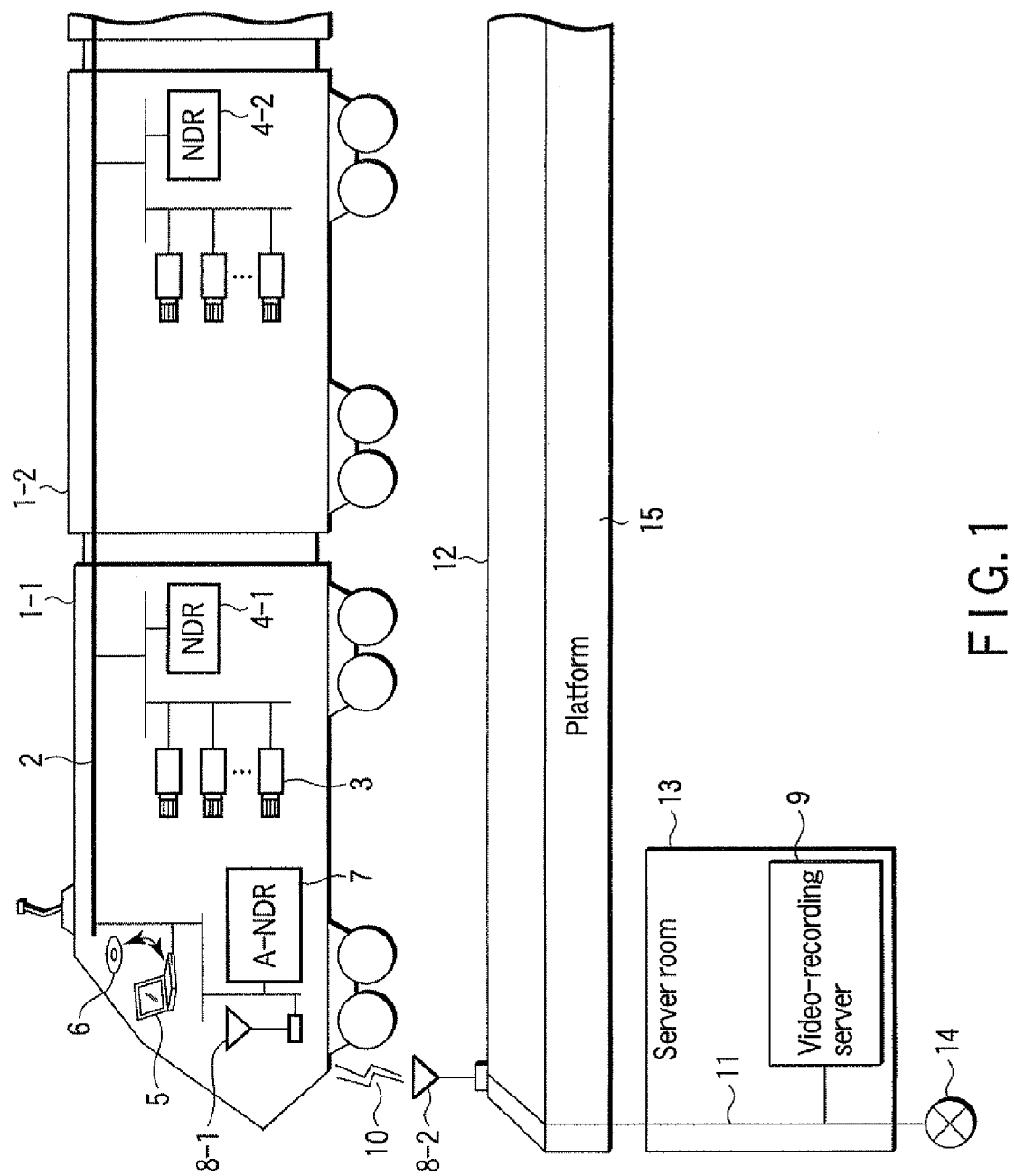
F I G. 1

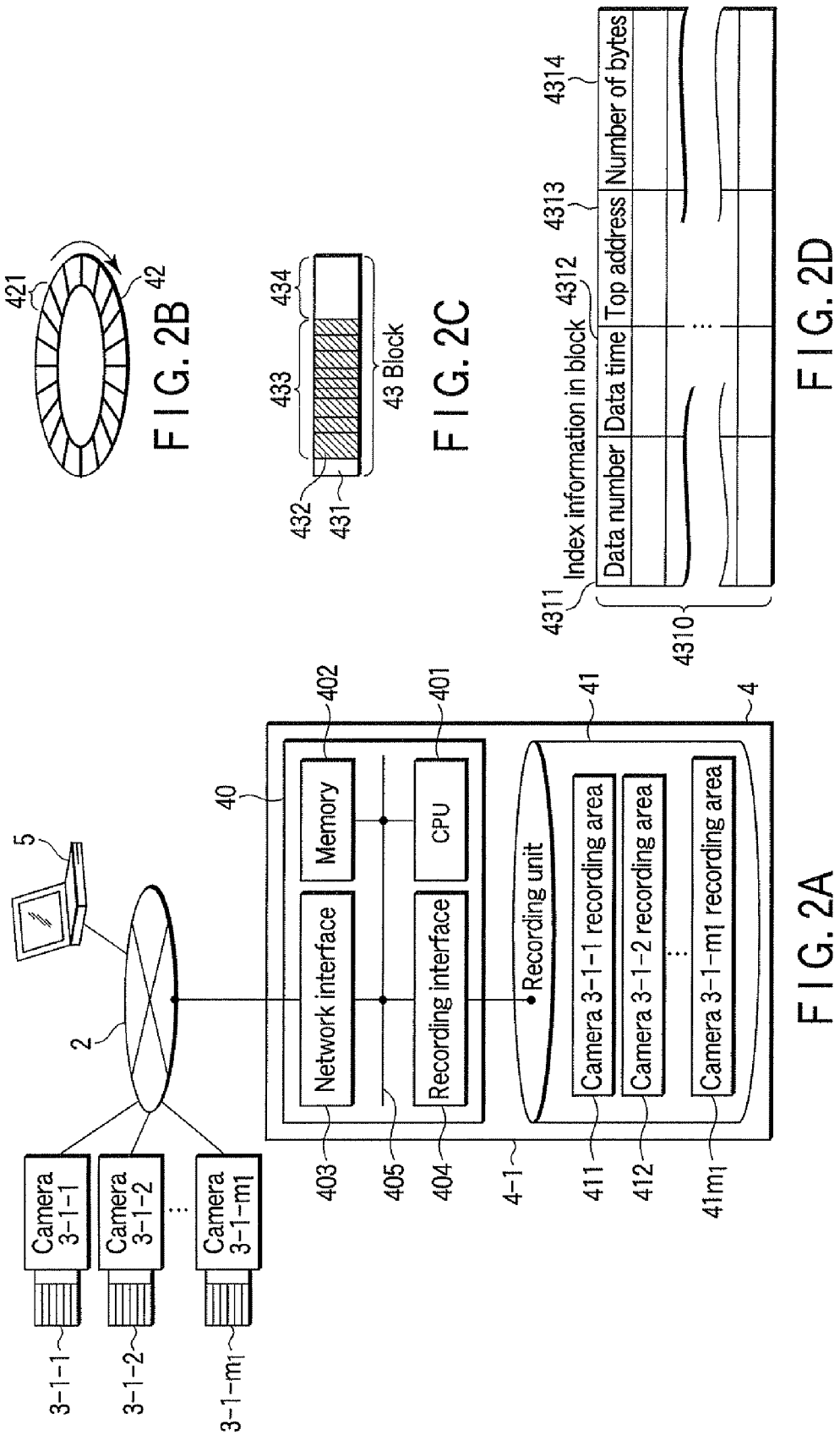

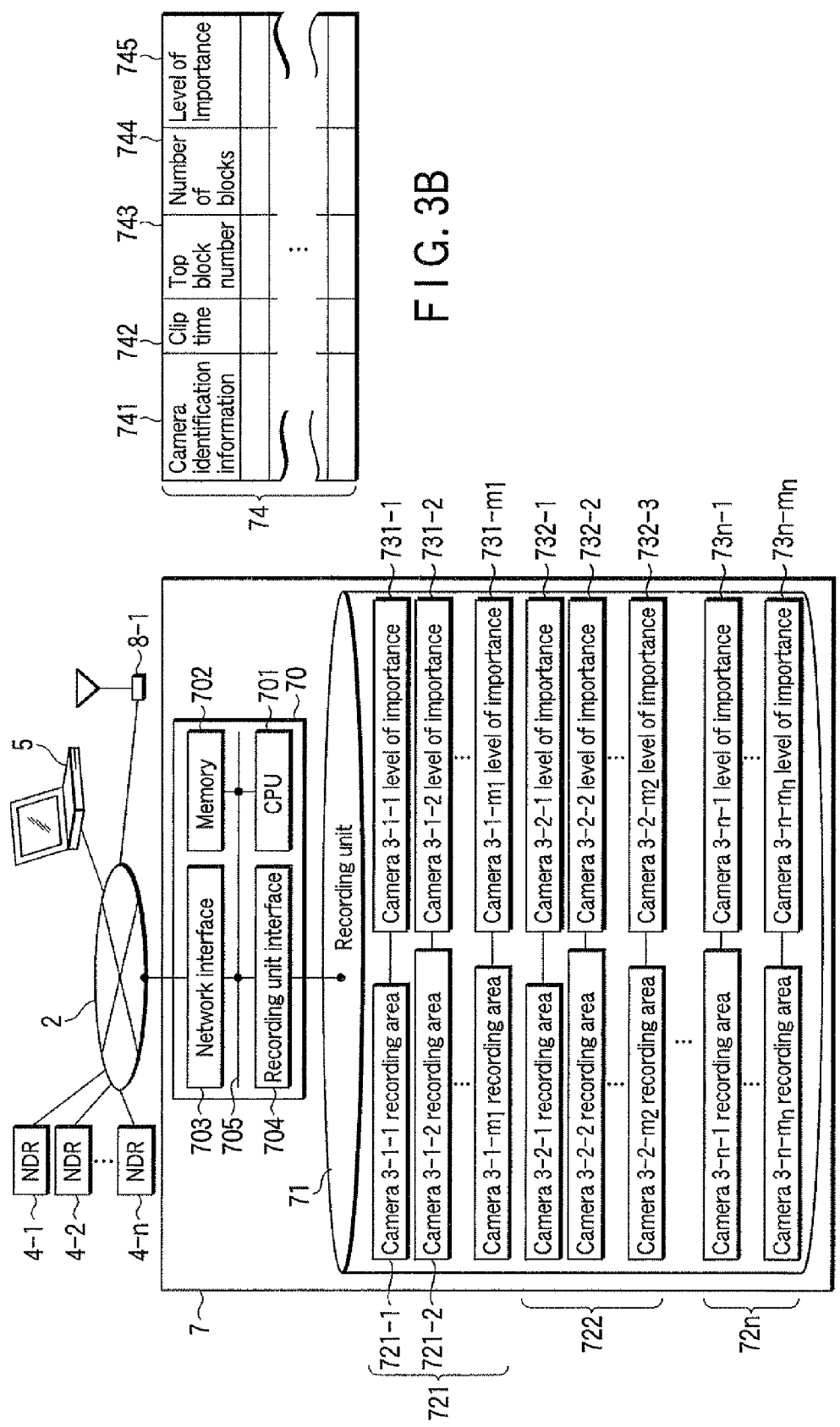

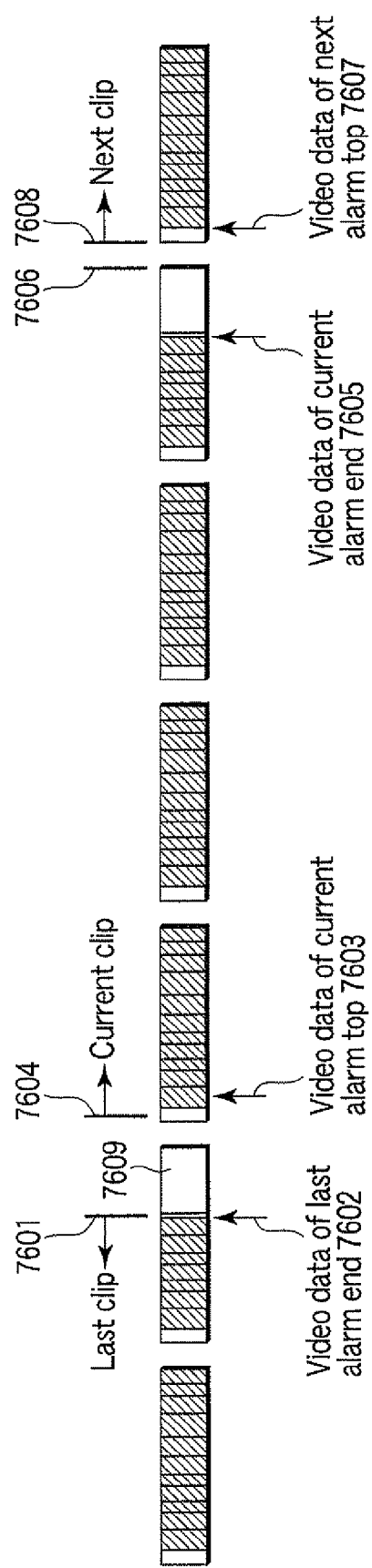
F I G. 5

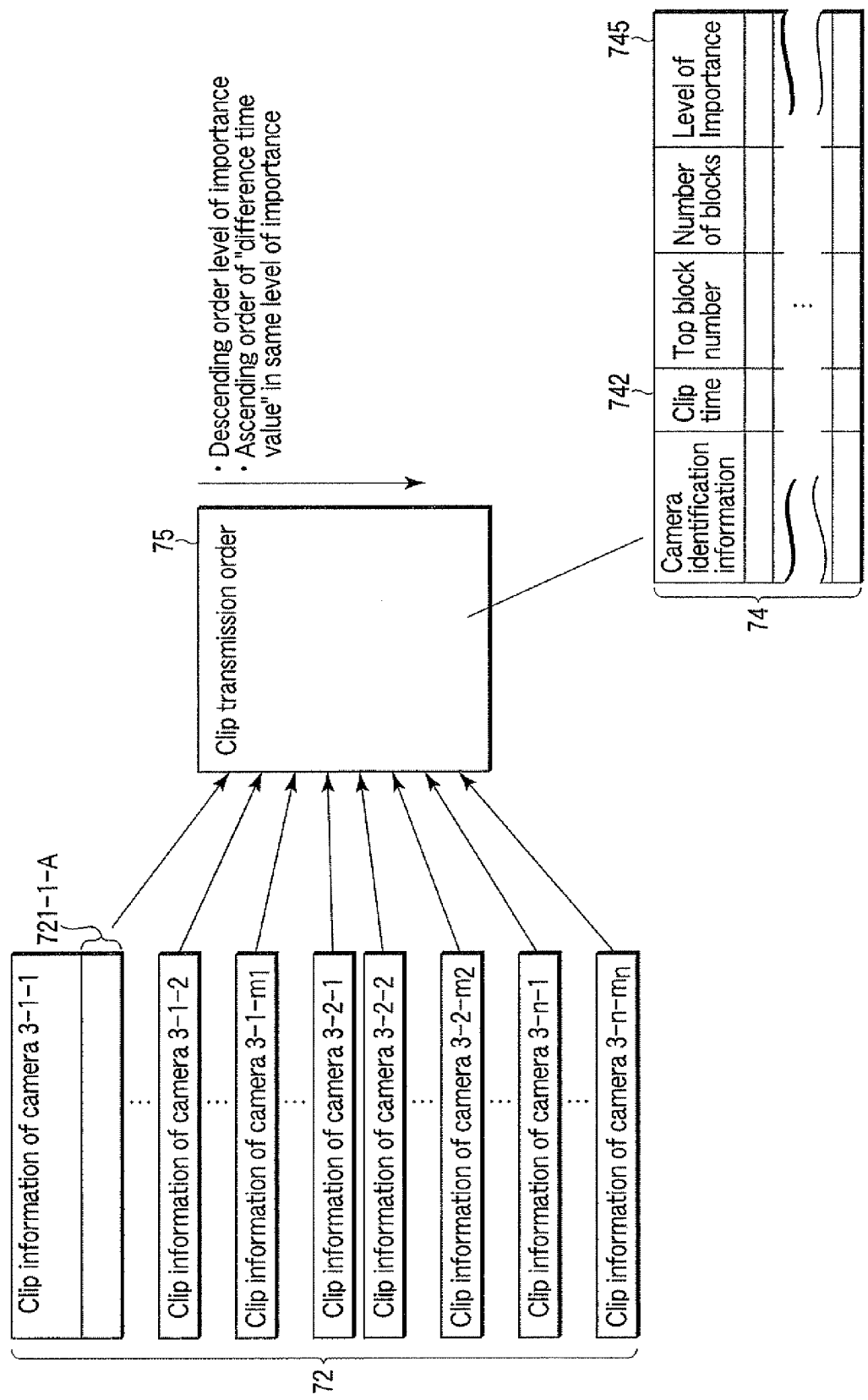
F I G. 6

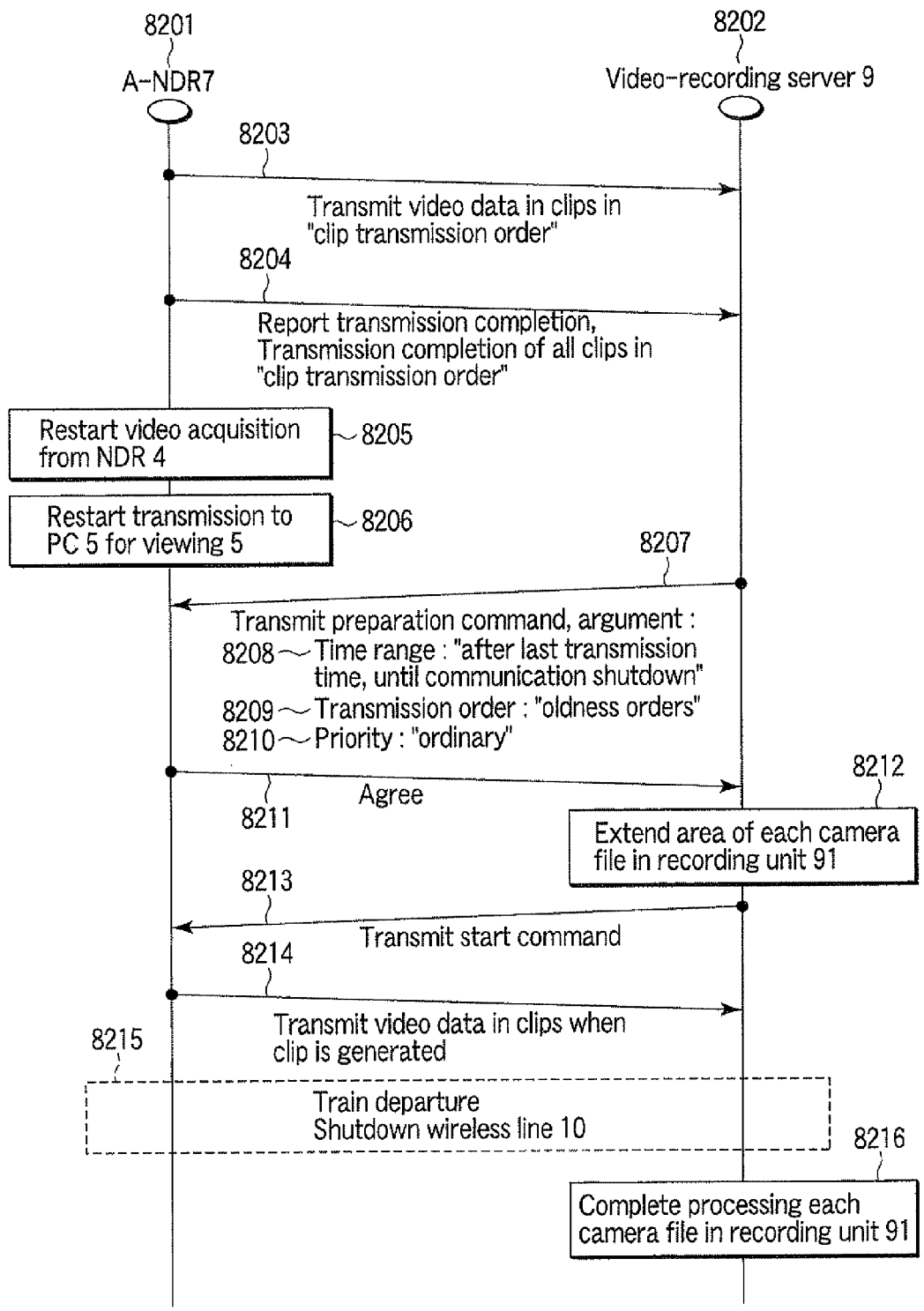
F I G. 10

VIDEO-RECORDING AND TRANSFER APPARATUS, AND VIDEO-RECORDING AND TRANSFER METHOD

CROSS-REFERENCE TO RELATED APPLICATIONS

This application is based upon and claims the benefit of priority from prior Japanese Patent Application No. 2008-191026, filed Jul. 24, 2008, the entire contents of which are incorporated herein by reference.

BACKGROUND OF THE INVENTION

1. Field of the Invention

One embodiment of the present invention relates to a video-recording and transfer apparatus, which is mounted on a vehicle such as a train, records video data captured with an imaging device, and transfers, if necessary, to a video recording apparatus of the outside of the vehicle (a fixed wireless station or another vehicle), and relates to a video-recording and transfer method.

2. Description of the Related Art

With an increase in speed and a reduction in costs of a network technique, an Internet Protocol (IP) network has become widely used for transmission of video data, and a monitoring system using the IP network has become introduced for monitoring passenger compartments, passages and doors of trains.

In this monitoring system, IP cameras for monitoring installed at arbitrary positions are connected to the IP network, and the video data captured with each IP camera has been transmitted to video-record in a personal computer for viewing (PC for viewing) via the IP network. The PC for viewing functions as a video-recording and transfer apparatus of the video data.

In the PC for viewing, the recorded video is overwritten to be deleted without being viewed once if the day passed without accident; however, an object video is confirmed by the PC for viewing to record it on an external recording medium by using the PC for viewing, and the recording medium can be taken out if any accident has occurred.

Frequently, it is realized that an accident has occurred after a certain time interval, such as several hours or several dates, have passed. If the video of the inside of the train are desired to be recognized, it takes much time to retrieve the video to store it on the external recording medium and take out the medium, in a case where the train in operation, and in a case where the train is located at a distance place even if the train is stopped.

As mentioned above, it takes much time even if the object train is specified; however, in a case in which a plurality of trains is targeted, it takes greater deal of times For instance, when looking for a specified person, even if there is information that the person ought to ride the train due to depart at around 5 o'clock, there is a possibility for the person to ride any one of a plurality of trains due to depart at earlier or later than around 10 minutes. Meanwhile, in a case in which the specified person has made a train connection and the person still desired to be traced, it takes much more time. There may is a desire to prepare for a situation in which the PC for viewing on the train cannot be viewed owing to a breakdown of a network digital recorder (NDR, registered trademark in Japan).

Therefore, storing the recorded video of the NDR on the train in a server for video-recording at a railway station or a train base station has become desired highly. As an ideal, there is a method for installing a broadband wireless communication device on the train and for video-recording all the camera images on the train to simultaneously to store the images in the server at the railway station or the train depot through wire communications. This method may achieve high real-time processing; however, this method occupies a broadband through broadband wire communications (120 KB/s for one camera, 12 cameras for one car, 26 MB/s=207 Mbps in a case of a train consisting of 18 cars). The width of the band turns to an amount of a communication line usage fee as it is, so that this method may be adopted only in a case with no thought of profit.

As regards another method, a method, for each installing short-range high-rate wireless communication devices (millimeter-wave transmission, etc.) on a train and a platform, and transfers video data in the NDR mounted on the train through the communication devices, is a possible approach. However, to transfer the video data for a long while within a short stop time at a stop station, the method occupies a broadband as a communication path and burdens the NDR during video-recording with a heavy load, and then, the resulting affects on current video-recording with IP cameras. Depending on the stop time, there is a possibility that all the videos may not be transmitted within the stop time of the train.

As given above, the conventional video-recording and transfer apparatus mounted on the vehicle burdens the transfer of the video data with the heavy load and may affects on the current video-recording.

BRIEF SUMMARY OF THE INVENTION

An object of the present invention is to provide a video-recording and transfer apparatus and a video-recording and transfer method configured to transfer video data at a high rate without affecting video-recording.

According to an aspect of the invention, there is provided a video-recording and transfer apparatus being mounted on a mobile body, video-recording video data from one or more imaging devices and transferring the video data outside the mobile body, comprising: one or more first video-recording devices which perform full-time video-recording or alarm video-recording through sensor detection of video data from the imaging device; a second video-recording device which reads the video-recorded from the first video-recording devices to record the video data; a communication device which determines property of a communication to and from the outside of the mobile body to establish a communication path to a partner's communication device in a communicable state; and a control device which reads the recorded video data from the second video-recording device to transfer the video data to the partner's communication device through the communication path when the communication path is established by means of the communication device, wherein the second video-recording device ranks each video data with importance for video-recording the video data from the first video-recording devices; and the control device reads the video data in descending order of importance for transferring the video data outside the mobile body.

According to an aspect of the invention, there is provided a video-recording and transfer method for video-recording video data from a video-recording and transfer apparatus being mounted on a mobile body, video-recording video data from one or more imaging devices, and transferring the video data outside the mobile body, comprising: taking in the video data from the imaging device to perform full-time video-recording or alarm video-recording into one or more first video-recording devices; reading the video-recorded video data from the first video-recording device to record the video data in a second video-recording device; determining property of a communication to and from the outside of the mobile body to establish a communication path to a partner's communication device in a communicable state; reading the recorded video data from the second video-recording device to transfer the video data to the partner's communication device through the communication path when the communication path is established by means of the communication device; ranking each video data with importance for video-recording the video data from the first video-recording devices into the second video-recording device; and reading the video data in descending order of importance for transferring the video data outside the mobile body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an exemplary block diagram depicting an embodiment of a video monitoring system in a train using a video-recording and transfer apparatus of the invention;

FIGS. 2A-2D are exemplary views for explaining configurations and processing content of NDRs 4-1 on lead cars 1-1 in the embodiment depicted in FIG. 1;

FIGS. 3A and 3B are exemplary vies for explaining configurations and processing content of archive-type NDRs (A-NDRs) 7 on lead cars 1-1 in the embodiment depicted in FIG. 1;

FIG. 5 is an exemplary view for explaining a way of sectioning a block in alarm video-recording of the embodiment depicted in FIG. 1;

FIG. 6 is an exemplary view for explaining a clip transmission order of the embodiment depicted in FIG. 1;

FIG. 10 is an exemplary sequence view depicting a flow of processing in a case where video data described in clip transmission order of the 75-th during a stop of the train in the embodiment depicted in FIG. 1.

DETAILED DESCRIPTION OF THE INVENTION

Figure 4A:
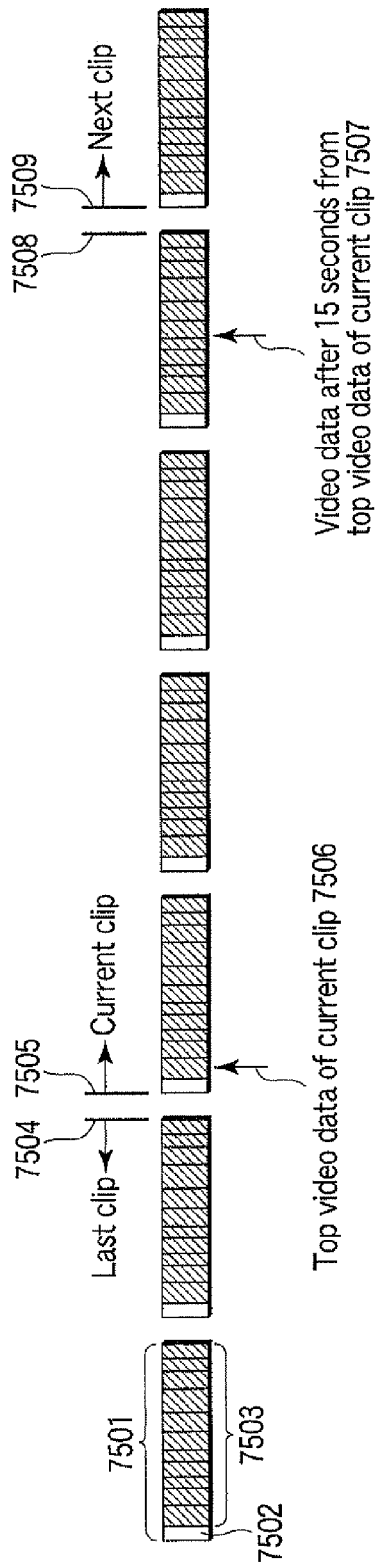
FIGS. 4A and 4B are exemplary views for explaining ways of sectioning clips of video data in the embodiment depicted in FIG. 1.

Hereinafter, embodiments of the invention will be described with reference to the drawings.

FIG. 1 shows a block diagram illustrating an embodiment of a video monitoring system in a train using a video-recording and transfer apparatus of the invention. In FIG. 1, reference symbols 1-1, 1-2, . . . , 1-$n$ designates cars of a train consisting of n cars, respectively. In the following description, a car 1 is a representative car of the train. An in-car local area network (LAN) 2 is set between cars of the train as a transmission path for transmitting a video signal, a control signal, a variety of items of data, etc. IP cameras 3-1-1 to 3-1-$m_1$ are mounted on the car 1-1, and connected to the LAN 2. Similarly, IP cameras 3-2-1 to 3-2-$m_2$ are mounted on the car 1-2, and connected to the LAN 2. In the description below, an IP camera 3 will be a representative camera of IP cameras.

The IP camera 3 compresses the video signal of the imaged object through the Joint Photographic Experts Group (JPEG) format, the Moving Picture Experts Group 4 (MPEG 4) format, etc., to output compressed video data to a network. The IP camera 3 may be provided with a microphone (not shown), a sensor for detecting an entering object (not shown), or a door sensor for responding to opening and closing at an imaging destination, and an output signal therefrom is considered to be included in the video signal.

In the car 1-1, an NDR 4-1 is mounted to be connected to the LAN 2. Similarly, an NDR 4-2 is mounted on the car 1-2 to be connected to the LAN 2. In the following description, an NDR 4 will be a representative of the NDRs. The NDR 4 has functions of storing the video data from the IP camera 3 in an internal recording medium (hard disk, or semiconductor memory) and outputting the video data in response to a video request from a PC 5 for viewing.

A crew cabin at the top or the tail of the train is provided with an information terminal device 5 (e.g., a data processor, such as a personal computer, and also for as a PC for viewing. Hereinafter it is for as a PC 5 for viewing). The PC 5 is connected to the LAN 2, comprises the IP camera 3 connected to the network and a Web browser, etc., for viewing the video from the NDR 4, and includes a recording medium (BD-R, DVD-R, etc.) drive device, a video data writing means, such as a USB port for connecting a USB storage, for writing the video data in an external recording medium 6.

The in-train video monitoring system with the configuration given above mounts several to ten and several of the IP cameras for each car, and video-records the video data by means of the NDR 4 mounted on each car. The recording medium of the NDR 4 has a capacity for storing the video, as much as around 200 hours, captured with the 12 IP cameras 3 (a recording medium of the NDR 4 is assumed as a HDD of an 1TB, and calculates through 120 KB/s for each camera 12). The NDR 4 performs cyclical recording, and over writes old video data by new data after filling the recording medium with the video data once. Therefore, if any accident does not occur, the video data is overwritten after passing around 200 hours.

Further, the system is provided with, for example, an A-NDR 7 in the crew cabin. The A-NDR 7 is connected to the in-car LAN 2, and reads the video data from the NDR 4 mounted on each car to collect it. In the car 1, a wireless LAN device (including an antenna) 8-1 is connected to the LAN 2. The LAN device 8-1 uses a wireless line 10 having a high ability for a millimeter wave of a short range, and establishes a communication path to and from a wireless LAN device 8-2 installed on a platform at a stop station.

Meanwhile, a wireless LAN 11 is set in a railway station to be connected to a network 14 connecting among railway stations. A server room 13 is provided in the railway station, and a server for video-recording 9 is installed in the server room 13 to be connected to the LAN 11.

Concrete processing of the A-NDR 7 in the monitoring system with the configuration of the above will be explained hereinafter.

That is, the A-NDR 7 receives the video data from all the NDRs 4 on the train during traveling of the train to store the video data. In other words, the video data from all the IP cameras is stored in the A-NDR 7. Here, when receiving the video data from the NDR 4, the A-NDR 7 ranks the video data in accordance with importance. More specifically, the A-NDR 7 highly rates video with motion, and video data at departure from the last railway station, or video data immediately before a stop of this time, and rates low the video data without any motion.

When the train stops at the railway station and a communication path is established between the wireless LAN devices 8-1, 8-2, the A-NDR 7 interrupts a video reception from the NDR 4 to allocate all abilities for the transmission of the video data to the video-recording server 9. Within a time section (e.g., video data within a time from the last station to this station) for a video transfer, the A-NDR 7 transmits the video data in descending order of importance to the server 9. At this moment, the server 9 stores the video data received from the A-NDR 7. When the train departs and the communication path between the wireless LAN devices 8-1, 8-2 is disconnected, the A-NDR 7 restarts the reception of the video data from the NDR 4 from the video data at the time of the interruption.

Meanwhile, the number of cars and the number of cameras for each car are different from each train, are different from each train. Therefore, the configuration of the monitoring system, such as the number of NDRs and the number of cameras on the train differs from each train. The server 9 on the station side may acquire video-recording data on each train only by accessing to the A-NDR 7 of each train even if the server 9 does not know the configuration of the monitoring system on each train in advance.

According to the configuration given above, the system does not affect on current video-recording during high-rate transfer of the video data. At the stop station, the transfer of the video data from the train to the railway station is performed between the A-NDR 7 and the server 9, and access to each NDR 4 is not needed. Therefore, the video reception from the IP camera 3 of each NDR 4 may be performed smoothly.

To respond a case where the transfer of the video data cannot complete within the stop period, the A-NDR 7 transfers the video in descending order of importance of the video with motion, the video data at the departure from the last railway station, or the video at the immediately before a stop of this time, and leaves the video with a low rank, such as video with no motion, until later. Thereby, even if the transfer of the video data is not completed with in the stop period, a part with high importance is stored in the server 9 on the station side.

Embodiment

Hereinafter, further concrete embodiment of the aforementioned monitoring system will be described.

One unit of the video captured with the IP camera is for as "unit video data" for convenience sake. It is assumed that video data in a JPEG format shows by one frame of the video data, and video data in a format of an MPEG-4 type shows by one group of VOP (GOV) of the video data.

The NDR mounted on each car will be explained in FIG. 2 by illustrating the configuration and the processing content of the NDR 4-1 in the lead car 1-1 as a representative. Operations of the NDRs 4-2 to 4-n do not differ from that of the NDR 4-1 except for the difference in number of the cameras.

FIG. 2A shows a configuration of the inside of the car 1-1, and the IP cameras 3-1-1, 3-1-2, ..., 3-1-$m_1$, NDR 4-1, and PC 5 for viewing are connected to the in-car LAN 2.

The PC 5 may includes a writing means for the BD-R and DVD-R, or an USB terminal which is connectable to a USB storage, and may install software for writing in such a recording medium for externally taking out.

The NDR 4-1 is a device for acquiring, recording and distributing the video data via the LAN 2 and consists of a computer board 40 and a recording unit 41. The computer board 40 is provided with a network interface 103 and a recording unit interface 404 to be connected to the LAN 2, in addition to a CPU 401 and a memory 402 to be used for signal processing. Each of them is connected through a control bus 405.

The recording unit 41 is composed of a recording device such as a magnetic disk, and a semiconductor disk. Recording areas 411, 412, ..., 41$m_1$ (referred to as the recording device 41 if it represents the recording areas) corresponding to the IP cameras 3-1-1, 3-1-2, ..., 3-1-$m_1$, respectively, exist by the number of cameras for recording in the recording unit 41, and the video data from each IP camera 3 is stored in the recording area 41.

In the NDR 4-1 configured as described above, a case in which the NDR records the videos captured with the IP camera 3 will be firstly described. The IP camera 3 compresses the captured video signal in frames in an image compression system such as the MPEG 4 or JPEG to transmit the compressed video signal in an IP packet form to the NDR 4 via the LAN 2.

The network interface 403 converts the received video data in the IP packet form into a transmission form on the control bus 405, and delivers the video data to NDR software executing on the CPU 404. The NDR software of the CPU 401 stores the received video data in the memory 402 once, and collects the video data to data, for example, into around 10-100 frames. The NDR software calculates a storage position of each recording area on the IP camera 3, and stores the data in the recording area 41 through the recording unit interface 404.

Information which is necessary for video-recording operations of the BDR 4 is stored in the memory 403 on the computer board 40. For example, a password PW1 of a setting authorized person PW1 or information for each IP camera is recorded. Representative example among them is shown in the following Table 1.

TABLE 1

| NDR 4-1 | Setting authorized person password |
|---|---|
| Information on IP camera 3-1-1 | Name of camera |
| | Type of camera |
| | Address (URL, IP address) |
| | Schedule |
| | Storage area size (byte) |
| | Top video data number and end video data number |
| | Video data number and acquisition time |
| Information on IP camera 3-1-2 | ... |
| ... | ... |

In Table 1, the password PW1 is a password for identifying the setting change authorized person. The information relating to the IP camera 3-1-1 includes a camera name (a character string added as a name so as to be easily identified by the setting authorized person); a camera type (a model identification name of a camera because communication systems may be different depending on models of the cameras); an address (an address which is necessary for connecting the NDR 4 to the IP camera 3-1-1 via a transmission path 2, e.g., a URL or an IP address of a camera device); a schedule (a schedule table in which the NDR may process to change a frame rate of video-recording in accordance with the daytime and nighttime, and it is determined at what time and how many frames of the video data should be captured); a recording area size (a byte size which is necessary for recording, for example, in the recording area 411 of the IP camera 3-1-1 on the recording unit 41); a top frame number and an end frame number (the first video data number at recording of video from the IP camera 3-1-1, the last video data number at completion of recording); and a video data number and an acquisition time (a video data number and an acquisition time on imaging the object with the IP camera 3-1-1).

Generation of the recording area 411 for the IP camera 3-1-1 of the NDR 4 is generated by the setting authorized person of the NDR 4 before starting video acquisition, the area 411 is made as a cyclical recording area 42 as shown in FIG. 2B and the video data captured with the IP camera 3-1-1 is cyclically recorded in the recording area 411 for the IP camera 3-1-1 of the NDR 4. Here, a management unit (e.g., 1 MB) of a fixed length sufficiently larger than unit video data is referred to as a block. One cyclic recording area is composed of a plurality of blocks. In FIG. 2B, one mass (421) in the recording area 421 indicates one of blocks.

One block 43 consists of a header part 431, a data-recorded part 433, and a data unrecorded part 434 as shown in FIG. 2C. The data-recorded part 433 shows a part with the video data stored therein in the block. The data unrecorded part 434 shows a part with the video data not stored yet therein in the block, namely, an unrecorded part. A plurality of items of unit video data is stored in the block 43. The header part 431 stored the number of the video data in the block and index information of the stored video data.

As shown in FIG. 2D, an in-block index information 4310 stored in the header part 431 includes index information of the number of all items of data stored in the block. The index information of the one item of video data is composed of a data number 4311, a data time 4312, a top address 4313, and the number of bytes 1314. The data number 4311 indicates a sequential number from "0" of the video data captured through the IP camera 3-1-1. The data time 4312 indicates the time in which the video data is captured through the IP camera 3-1-1. The top address 4313 indicates from which address in the block the video data is recorded. The number of bytes 4314 indicates the number of bytes of the video data.

The block 43 is created in the memory 402, when the video data is acquired from the IP camera 3-1-1, if there is an empty capacity in which the acquired video data may be stored in the data unrecorded part 434, the video data is recorded in the data unrecorded part 434 and also the video data is added to the data recorded part 433 to update the index information in the header part 431.

When acquiring the video data from the IP camera 3-1-1, if there is no empty capacity in which the acquired video data may be stored in the data unrecorded recording part 434, the block is stored in the cyclical recording area 42 of the recording area 411. Here, in the cyclical recording area 42, the block information generated in the memory 402 is recorded from the head of the area, when achieving the tail thereof; the block information is overwritten from the head area again.

The recording area for IP camera 411 consists of a plurality of blocks 43. Using the blocks 43 cyclically achieves the cyclical recording. For video-recording, extension of a capacity is not performed automatically, and cyclical recording is performed in the pre-secured area. Since a cyclical recording system is disclosed in detail in Jpn. Pat. Appln. KOKAI Publication No. 2004-355724, and Jpn. Pat. Appln. KOKAI Publication No. 2005-92679, the detailed explanation is omitted herein.

Here, the block 43 secured for recording in the memory 402 is referred to as a recording cache, and the block 43 secured for recording from the recording unit 41 in the memory 402 is referred to as a recording cache.

A head video data number and a tail video data number are recorded on the memory 402. Similarly, block numbers (sequential numbers from "1" independent of each camera) is given for management of the blocks.

Next, a case where the recorded video is reproduced as mentioned above will be described. A user who wants to view the video recorded in the NDR 4 activates reproduction software in the PC5. The NDR reproduction software acquires the video data for each video data from the NDR 4, and performs display and reproduction processing of the video data on a screen of the PC5. The processing will be described in detail. When executing the NDR reproduction software on the PC 5, a video distribution request is transmitted to the NDR 4 via a transmission path 2 in the IP packet form. The video distribution request transmitted from the PC 5 is transmitted through the transmission path 2 in the IP packet form to be arrived at the network interface 403.

The network interface 403 converts the received distribution request in the IP packet form into a form transmitting the request on the control bus 405 to transmit the request to the NDR software executing on the CPU 401. The NDR software reads a block including a request frame in a reading cache memory, for example, from the recording area 411 for the IP camera 3-1-1 through the recording interface 404 in accordance with the distribution request, and transmits the video data in the frame on the cache memory to the PC 5 via the network interface 403 and the transmission path 2 in the IP packet form. The NDR reproduction software of the PC 5 decodes the received video data to display it on the screen. When acquiring one frame of the video data from the PC 5, target video data may be acquired by specifying the video data according to the video acquisition time or the video data number.

The IP camera 3 may output sensor information as well as the video data. In a case where the IP camera 3 is mounted on the train, opening/closing information of a door, a human-detection sensor, and a moving state detection result are frequently set as sensing objects. The video-recording from the IP camera 3 to the NDR 4 may be operated to always video-record during train operation, and may video-record only when a sensor is. The former is called "full-time video-recording", and the later is called "alarm video-recording". The video-recording operations are usually selected to be used in accordance with the installation positions and imaging objects of the IP camera 3. "Full-time video-recording" or "alarm video-recording" may be set from the NDR 4 for each IP camera 3. When recording the video data, the NDR 4 may record the information identifying whether or not the video data is recorded through "full-time video-recording" or "alarm video-recording". The NDR 4 also records the sensor information of the IP camera 3.

Next, the configuration and the processing content of the A-NDR 7 will be described with reference to FIGS. 3A and 3B.

While the NDR 4 acquires the video data from the IP camera 3, the A-NDR 7 acquires the video data from the NDR 4. FIG. 3A shows a configuration inside the car 1-1, and the NDRS 4-1, 4-2, . . . , 4-n, the A-NDR 7, the PC 5 and the wireless LAN device 8-1 are connected to the LAN 2.

The A-NDR 7 is a device to implement the acquisition, recording and distribution of the video data via the in-car LAN 2. The A-NDR 7 is connected to the PC 5 for viewing which views the NDR 4 and video data and to the wireless LAN device 8-1 via the LAN 2. At the stop railway station for performing video transfer, the A-NDR 7 is connected to the network 11 on the station side through the LAN device 8-1 to transmit the video data to the video-recording server 9 as shown in FIG. 1.

The A-NDR 7 is composed of the computer board 70 and the recording unit 71 as is similar to the NDR 4. The computer board 70 is provided with a network interface 703 to be connected to the LAN 2 and a recording unit interface 704 to be connected to the recording unit 71 other than a CPU 701 for signal processing and a memory 702, and they are connected to one another through a control bus 705. The control unit 71 is configured to a recording device such as a magnetic disk and a semiconductor disk.

In the recording unit 71, a recording area corresponding to a recording area for a camera of each NDR 4 is disposed (if the recording are is a representative thereof, it is refereed to as the recording device 71). Reference number 721 corresponds to a recording area in the NDR 4-1, and it includes recording areas for the cameras 3-1-1 to 3-1-$m_1$. Similarly, reference number 722 corresponds to a recording area of the NDR 4-2, and it includes recording area for the cameras 3-2-1 to 3-2-$m_2$. Hereinafter, there are recording areas of all the IP cameras of all the NDRs 4 up to the number 72n and the video data from each NDR 4 is recorded in the recording area 71.

A video management method in the A-NDR 7 of the configuration of the above is assumed to treat the video data in units referred to as a clip. More specifically, sequential video-recording of 15 seconds is set as one clip, alarm video-recording of one alarm section is set as one clip, full-time video-recording of video data is sectioned into around intervals of around 15 seconds is set as one clip, and alarm video-recording of video data of one alarm is set as one clip.

Information 74 of one clip is composed of camera identification information 741, a clip time 742, a top block number 743, the number of blocks 744, and level of importance (a value representing the importance in terms of points) 745, as shown in FIG. 3B. The identification information 741 is information to identify from which camera the video data is taken. The clip time 742 indicates "(time of oldest video data in clip+time of latest video data in clip)/2" as an intermediate time of the video data in the clip.

In a case in which a plurality of frames are included in the video data as is the MPEG type, the intermediate between the top frame of the oldest video data in the clip and the end frame of the latest video data in the clip is set as the clip time 742.

The top block number 743 indicates the block number of the cyclical recording area in the recording area for camera with the oldest video data in the clip recorded therein. The block number is a number indicating which time the video data is recorded in the cyclical recording area; the number is composed of a sequential number form "0". Even when overwriting is started, the block number is not reset, so that the block number after the overwriting becomes larger than the number of the blocks in the cyclical recording area.

The number of blocks 744 indicates the number of the blocks of the clips in the cyclic recording area in the recording area for camera, and it values as "(block number with oldest video data in clip existing therein)−(block number with oldest video data in clip existing therein)+1". A minimum value is generated in a case in which the oldest video data in the clip and the latest video data in the clip are exist in the same block, and the minimum vale is "1".

The level of importance "745" is a value (rank) representing how a clip is important in term of points, it is calculated in creation of clip information. This level of importance is used in order to decide order for transferring the video data to the video-recording server at the stop railway station. A level of importance calculation method will be separately described later.

The clip information 74 is clip information of one camera recording area. Reference number 731-1 designates a recording destination of the clip information for the camera recording area 721-1. The clip information from 731-1 to 73n-$m_n$ is present at two spots: one is on the memory 702 and the other is in the recording unit 71. The clip information 74 is treated on the memory 702, and is periodically recorded in the recording unit 71.

While obtaining the video data from the NDR 4, the A-NDR 7 updates the clip information 74. The clip information of a part created by overwriting of the video data is deleted from the memory 702, and then, it is also deleted from the recording unit 71 when the clip information 74 in the recording unit 71 will be updated next time.

During output of the video data outside the train at the stop railway station, the A-NDR 7 interrupts the video acquisition from the NDR 4, and performs the video acquisition other than the output period.

The processing of the acquisition of the video data from the NDR 4-1 through the A-NDR 7 will be described by way of example of the video data captured with the IP camera 3-1-1, namely, the video data recorded in the NDR 4-1.

The NDR 4-1 acquires the video data from the IP camera 3-1-1 to cyclically record the video data in the camera recording area 411. The camera recording area 721-1 of the A-NDR 7 cyclically records the video data in the camera recording area 411 of the NDR 4-1. The A-NDR 7 compares between the time of the latest video data in the camera recording area 721-1 and the time of the latest video data in the camera recording area 411. If there is no difference therebetween, the situation means a state in which the A-NDR 7 is synchronized with the NDR 4-1, and the A-NDR 7 does not perform video acquisition from the recording area 411 for camera of the NDR 4-1. If there is any difference, the A-NDR 7 acquires the video data one by one from the recording area 411 of the NDR 4-1 in a direction from an old side to a new side within the difference to record the video data in the recording area 721-1.

The rate to acquire the video data from the NDR 4 by means of the A-NDR 7 is performed at a rate of several times as faster than the rate to acquire the video data from the IP camera 3 by means of the NDR 4.

When requesting the video data to the NDR 4, since the A-NDR 7 specifies the video data, the A-NDR 7 adds the information identifying the camera areas in the NDR 4 and the values indicating the time of the video data as an argument. Here, it is assumed that the time of the video data requested from the A-NDR 7 to the NDR 4 is "A".

First, the A-NDR 7 requires the video data at a time point "A" in the camera area 411 to the NDR 4. The NDR 4 reads the video data at the required time "A" from the recording unit 411 to transmit the video data to the A-NDR 7 in the IP packet form via the LAN 2.

The network interface 703 converts the received video data in the IP packet form into a form for transmitting the video data on the control bus 705 to transfer the video data to NDR software execution on the CPU 401.

An archive NDR software in the CPU 701 stores the received video data once in the memory 702 and collects the video data, for example, into around 10-100 frames. The archive NDR software calculates the storage positions in the recording area of the IP camera 3-1-1 to stores the video data in the recording area 71 through the recording unit interface 704. The information necessary for video-recording operations of the A-NDR 7 is stored in the memory 702 on the computer board 70. For instance, setting authorized person password PW1, or the information of the NDR 4 at the connection destination is recorded. Among of them, the representatives will be shown in the following Table 2.

TABLE 2

| A-NDR 7 | Setting authorized person password |
|---|---|
| Information on IP camera 3-1-1 recording area (for 721-1) | Identification name of camera NDR address (URL, IP address) Camera recording area in NDR, identification information Acquisition rate Storage area size (byte) Top video data number and end video data number Video data number and acquisition time Clip importance calculation method |
| Information on IP camera 3-1-2 recording area (for 721-2) | ... |
| ... | ... |

In Table 2, the password PW1 is a password for identifying the setting authorized person of the A-NDR 7.

The information relating to the recording area of the camera 3-1-1 includes a camera identification name (a character string given as a name so that a setting manager may easily identify), an NDR address (an address which is necessary for the archive NDR 4 to be connected to the NDR 4 through the transmission path 2, e.g., the URL and IP address of the NDR 4), information for identifying the camera recording area in the NDR 4 at the connection destination (identification name of the camera 3-1-1, number indicating the camera 3-1-1, etc.), an acquisition rate (a rate of acquiring the video data from the NDR 4 by means of the A-NDR 7 time interval; time interval shorter than the time interval in which the NDR 4 acquires the video data from the IP camera 3-1-1 is set), a recording area size (for example, a byte size needed to record the video data in the recording area of the IP camera 3-1-1), a top frame number and an end frame number (the first video data number by which the video from the IP camera 3-1-1 is recorded, the last video data number when the recording is completed), a video data number and an acquisition time (a video data number and an acquisition time when the IP camera 3-1-1 imaged the object), a clip importance calculation processing method (capable of changing a calculation procedure of importance of a clip for each camera).

The setting authorized person of the A-NDR 7 generates the recording area 721 for the IP camera 3-1-1 of the A-NDR 7 before the start of the video acquisition.

In the configuration of the given, operation of the A-NDR 7 in a video reception will be described.

The A-NDR 7 firstly generates importance information for each clip while receiving the video from the NDR 4. At this moment, the A-NDR 7 stores the information of the presence or absence of alarm, moving state detection, sensors (human-detection sensor, etc.), stop time section at a stop railway station, etc.

The A-NDR 7 adopts the cyclical recording system in the IP camera recording area as is similar to the NDR 4. It is similar to the case of the NDR 1, in which the cyclical recording area is an assembly of blocks, and the video data in the block 43 is treated in the same way.

The A-NDR 7 acquires the video data from the NDR 4 to section the video data as clips. The way of sectioning the clips will be described hereinafter.

If the video-recording between the IP camera 3 and the NDR 4 is implemented as "full-time video-recording", the A-NDR 7 sections the video data from the NDR 4 into around 15 seconds as one clip. After the video data appeared after 15 seconds from the top video time of the clip, the switching time of the first block is set as the end=a section.

The way of sectioning will be described by using FIGS. 4A, 4B. In FIG. 4A, reference number 7501 indicates one block of the cyclical recording. The hatched lines of reference number 7503 indicate that the video data is stored there. Other blocks are expressed in the same way. Clips up to reference number 7504 indicate the previous clips and clips from reference number 7505 indicate the current clips. Reference number 7506 indicates the video data at the top of the current clips. Reference number 7507 indicates the video data after the lapse of 15 seconds from the video-recording time of video data 7506. The end 7508 is the block with video data 7507 stored therein. The blocks from reference number 7509 are those of the next clips.

In a case where the video-recording between the IP camera 3 and the NDR 4 is "full-time video-recording", and when the train is arrived at the railway station to interrupt the acquisition of the video data from the NDR 4, the block is sectioned as the end of the clips at that time. After the restart of the acquisition of the video data, the video data is stored from the top of the next block as the next clips. This aspect is shown in FIG. 4B. In FIG. 4B, reference number 7511 indicates the top of the current clips. Reference number 7512 indicates the video data acquired immediately before the interruption. The end of video data 7512 at the interruption is set as the end (7513) of the current clips. When the acquisition of the video data from the NDR 4 is restarted, the video data is not recoded at a block 7514, and the video data is recorded as the next clips from the next block (7515).

In a case where the video-recording between the IP camera 3 and the NDR 4 is "alarm video-recording", the A-NDR 7 sections the block at a section of "alarm video-recording". This aspect will be described with reference to FIG. 5. In FIG. 5, reference number 7602 indicates the video data at the end of the last "alarm video-recording". The end of video data 7602 is the end of the previous clips 7601. Reference number 7609 indicates an unused area in the block. The unused area is generated because the block is sectioned at the sections of the alarm. Reference number 7604 indicates the top of the current clips, and reference number 7603 indicates the top video data of current alarm to be surely become the top of the block. Reference number 7605 indicates the video data of the end of the current alarm, and the end of video data 7605 becomes the end of the clips of video data 9606. Since the block is sectioned at the sections of the alarm, the top video data 7607 of the next alarm, namely, the top 7608 of the next clip becomes the top of the block.

As described above, video data of different clips is not recorded in the same block. This is an idea so that, for transmitting the video data from the A-NDR 7 to the video-recording server 9, the minimum unit of the transmission is not the video data unit but the block unit.

In the memory 702, the top video data number and the end video data number are recorded. Similarly, to manage the blocks, block numbers (sequential numbers from one independent for each camera recording area) are added. The memory 702 also records the top block number and the end frame number. The arrival time of the train and the departure time thereof are also recorded in the memory 702.

Since the case in which the video recorded as described above is reproduced by the PC 5 for viewing operates in the same manner, its description will be omitted.

Next, a calculation method of the level of importance for each clip will be explained.

The level of importance 745 adopts a point-addition system. The normal initial value is "0". There are both a point-addition system shared with all IP cameras and an individual point-addition system for each IP camera.

(Level of Importance Common to All Cameras)

If the clip time 742 is at before and after one minute of the stop time at the stop station (from before one minute of the arrival at the stop station until after one minute of the departure), the point 745 is increased by one.

(Individual Point-Addition Method for Each IP Camera)

To make differences in importance from cameras, the initial value of the level of importance 745 is variable for each IP camera. Raising the initial value of the level of importance of a camera imaging an important place makes it possible to transfer the video data from an important camera to the video-recording server 9 on the railway station side in preference to the video data from other cameras. Raising the initial value of the IP camera of "alarm video-recording" makes it possible to preferentially transfer the video data from the IP camera during intermittent video-recording to the station side.

To make a difference in importance among the clips of the identical camera in accordance with an external situation, when the IP camera 3 outputs sensor information, it is able to increase the level of importance 745 by one if there is the sensor information exceeding a threshold in the clips. The threshold may not be fixed but vary (e.g., under a case of deviation from a specified width more or less the averaged value, or under a case of excess of theta of the Bollinger band may be acceptable).

The IP camera 3 may use a variety of sensors, such as a door sensor reacting to opening/closing of the door, a human-detection sensor reacting to movement of a person, an audio sensor, and a sensor outputting sensor information in a case where an image analysis is applied to recognize that a person is imaged in a video, and how and when the importance should be varied may be set for each IP camera.

Next, a procedure of generating transfer order information of this time from transfer section instruction information of this time will be described.

First, the video time is an intermediate time in a clip=(top+end of clip)/2, and a level of importance from the IP camera 3 is decided in accordance to the presence or absence of alarm, moving state detection information, and information from sensors. For information on the neighborhood of the railway station, levels of importance of a railway station within a transfer section are given priority. If the levels of importance are equal to one another, the order of levels of importance is set to ascendant order of time values of differences in a section. More specifically, in comparison between (1): transfer section the latest side minus video time and (2): video time minus transfer section the oldest side, the time value of difference in the section is smaller one, and transfer order is decided according to these subtracted time values (1), (2).

The 75-th of clip transmission order will be described with reference to FIG. 6.

In FIG. 6, the 75-th indicates the order of clip transmissions for transmitting the video data from the A-NDR 7 to the server 9. When starting the transmission of the video data from the A-NDR 7 to the video-recording server 9, the server 9 gives an argument indicating a range of "transmit and check clips from one time to the other time". Here, the range of these times is called a "transmission range", the oldest side is called "transmission range the oldest time", and the latest side is called "transmission range the latest time". In each clip information, as a result of comparison between a "clip time minus transmission range the oldest time" and a "transmission range the latest time minus clip time", a smaller one is referred to as a "difference time value".

Reference number 72 in FIG. 6 designates clip information of each camera on the memory 702. Reference number 721-1 designates clip information corresponding to the transmission range in the clip information of the camera 3-1-1. Reference number 75 indicates an area for lining up clips secured on the memory 702 in order of transmissions. The area includes an assembly of clip information and a constituent element of each clip is the same as the information 74. An area for storing the clip information of the number of corresponding clips is secured in the transmission range of all the camera areas.

The generation method of the clip transmission order 75 will be described. The number of clips corresponding to the transmission range is counted from the clip information of all the cameras, secures the area for the clip transmission order 75, and copies the corresponding clips in the clip transmission order 75. In the transmission order 75, the clips are sorted in descending order of the levels of importance 745. Among the clips with the same levels of importance 745, the clips are sorted in ascending order of the difference time values. By this sorting, the clip transmission order 75 is set in descending order of the levels of importance. Among the same level of importance, the transmission order 75 is set in the order in which the transmission time is close to the arrival times at the last station or this station.

Figure 7:
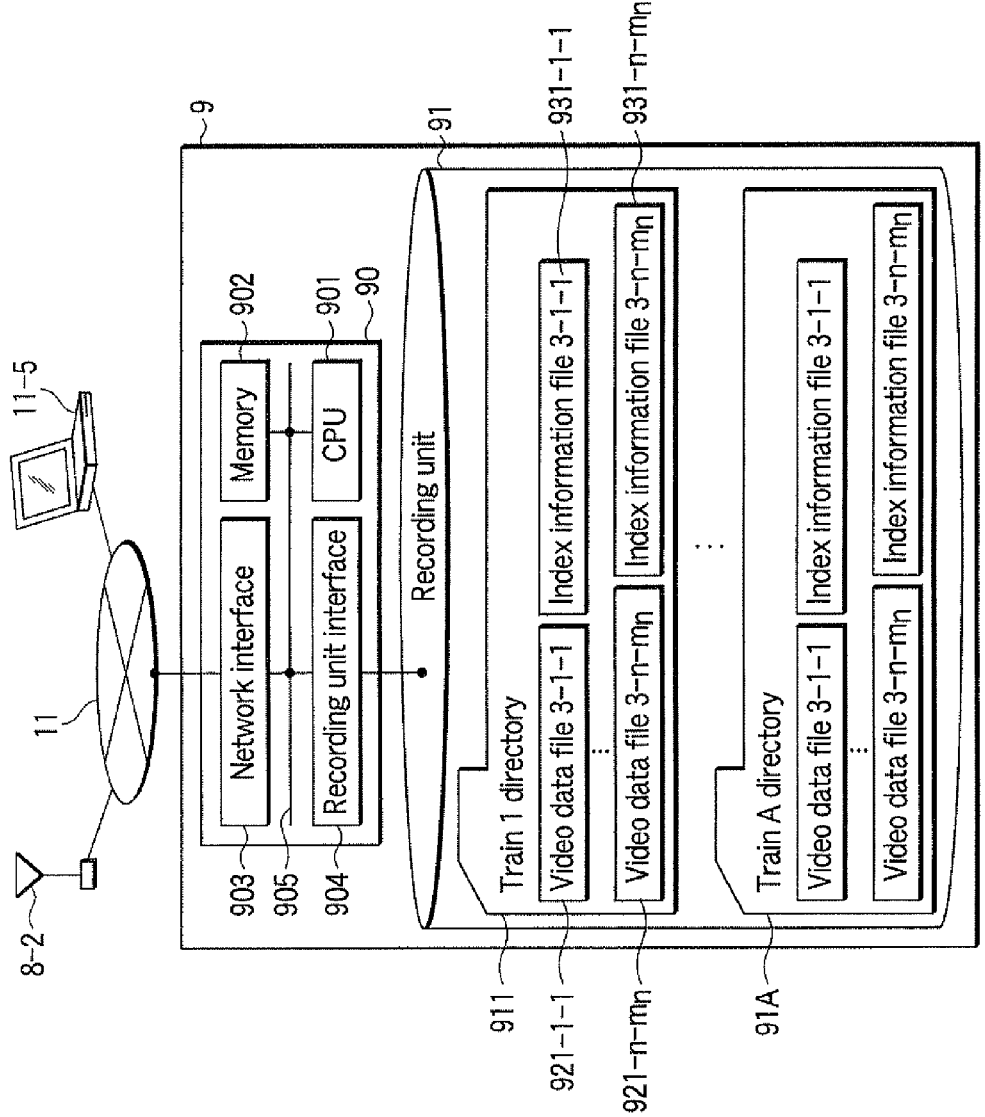
FIGS. 7A and 7B are exemplary views for explaining configurations and their processing content of video-recording servers 9 of the embodiment depicted in FIG. 1.

The configuration and processing content of the video-recording server 9 will be explained with is reference to FIG. 7. In FIG. 7A, the wireless LAN 11 is set in the railway station to transfer the video signal, and connects a plurality of computers to transfer a control signal and a signal such as data. Reference number 11-5 indicates a PC for viewing. Reference number 8-2 indicates a wireless LAN device for communicating with the trains.

The PC 11-5 includes a writing means in a BD-R or a DVD-R, or a USB terminal which is connectable to a USB storage and may install software for writing in a recording medium such as a tape medium for taking out or storing in a long while.

Reference number 9 designates a video-recording server being connected to the wireless LAN (network) 11 and storing the video data. The server 9 is a device for acquiring, recording and distributing the video data via the in-station (wireless) LAN 11. The server 9 is connected to the PC 11-5 via the LAN 11, and is connected to an archive NDR on the train via the LAN 11, and the wireless LAN devices 8-1, 8-2.

The server 9 is composed of a computer board 90 and a recording unit 91. On the computer board 90, a network interface 903 to be connected to the LAN 11, a recording unit interface 904 to be connected to the recording unit 91, a memory 902, and a CPU 901 are disposed, and they are connected to one another through a control bus 905. The recoding unit 91 comprises a recording device such as a magnetic disk and a semiconductor disk.

The servers 9 may be installed in all the stations on the railroad of the train, or may be installed only in some main stations on the railroad. The servers 9 may be installed in a data center, etc., at a place away from the stations. One set of the servers 9 may be assigned to solely one platform of one station, or may be assigned to a plurality of platforms at a plurality of stations. Hereinafter, to simplify the description in this embodiment, it is assumed that the server 9 is assigned to one platform at one station.

The following will describe the processing of the foregoing video-recording server 9.

At the start of the video-recording, upon establishment of a communication with a train, a directory is created by naming a time name. According to the information of the number of cameras and the number of each byte from the A-NDR 7, an area for a video data file and an area for an address order index information file for each camera are created.

During transfer of the video data, every time the video data of 1 MB unit in the clip from the A-NDR 7 is received, the server 9 records the video data in the file for each camera, and obtains an address and time of each frame (GOV) to describe them in the index information.

When completing the transfer of the video data, the server 9 changes the size of the video data file of each camera into the size in which the video data is actually written. The server 9 creates the time order index information file in which the address order index information files are sorted in order of time (the time order index information file may be arranged on a memory without actually creating the address order index information file, and solely the time order information file as a result of the sort in time order may be recorded on the recording medium).

Meanwhile, many trains stop at one platform in its station at different times. Therefore, even when the server 9 is assigned to one platform, the server 9 performs video-recording of the video data from many trains. The number of cars and the number of cameras in each car differ from each train (this situation is not suitable for the cyclical recording system for pre-securing an area for each camera to record by overwriting). Thus, the server 9 adopts a system for obtaining the number of cars, cameras, and bytes of video data of each camera to create a storage area (video data file) from the train side every time the train arrives.

A directory is disposed in the recording unit 91 for each train. The recording unit 9 prepares a directory 911 of a train 1 which has stopped at a certain time, and prepares a directory 91A in a train "A" which has stopped at another time. Video data files storing the video data of each camera are provided in the directory 911.

There are recording areas 921-1-1, . . . , 921-n-m corresponding to the cameras 3-1-1, . . . , 3-1-$m_1$, respectively, in the video data file. The video data in the video data file forms a line in descending order of importance given in the train, and the video data does not form a line in order of times. Therefore, index information 94 in which addresses of the video data for reproduction are formed a line in order of times is prepared. Index information file 931-1-1 corresponding to the video data file 921-1-1, and index information file 931-n-$m_n$ corresponding to the video data file 921-n-$m_n$ are created when creation of each video data file is completed.

Each item of the index information 94 consists of a time 941 and an address 942, respectively, as shown in FIG. 7B. The time 941 shows a time of video data, and the address 942 shows an address in a video data file. During video acquisition from the A-NDR 7 to the server 9, the index information 94 is treated on the memory 902.

The server 9 receives the video data in blocks, and stores the video data at the end of the video data file. Simultaneously, the server 9 reads a block header 4310, converts the time 4313 into the time 941, and converts the address 4313 in the block into the address in the file to store them in the address 942. When completing the acquisition of the video data, the index information 94 is sorted in ascending order of the time 941 to record the index information 94 in the index file 931.

When the train stops, that is, when the wireless LAN line (wireless line) 10 is established (as regards determination reference, electric field intensity and a signal-to-noise ratio, a stop signal, etc., are used, ant it is not specified especially because it is not a main point of this invention), the A-NDR 7 interrupts the video acquisition from the NDR 4, and the A-NDR 7 interrupts the video data transmission to an in-viewing client who has been viewing the video. Then, the A-NDR 7 transmits the number of cameras, the number of video data bytes within a transfer section range of each camera to the server 9. The video data is transferred in clips, and is transferred for each 1 MB in the clip. At the top of the clip, there are a header part and a data part in the information of 1 MB showing identification information (car number+camera number) of each camera. The header part includes the index information of the data part. What frame (what GOV) of the video data is present in the data part, an address in 1 MB of each frame (each GOV), and a time of each frame are described in the data part.

The flow of processing in a case in which the train stops at the station and the A-NDR 7 starts transmission of the video data to the video-recording server 9 will be described hereinafter.

Figure 8:
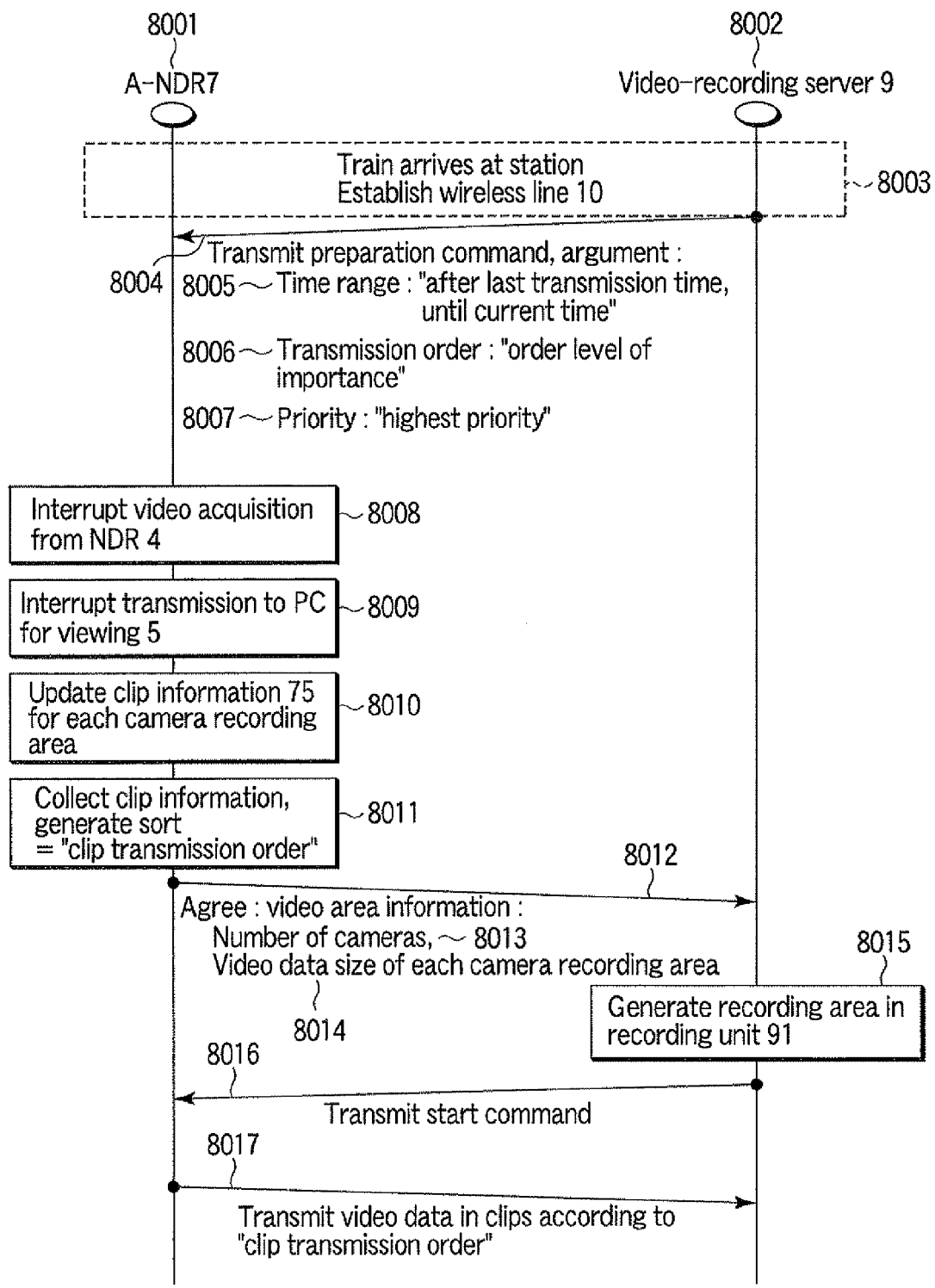
FIG. 8 is an exemplary sequence view depicting a flow of processing at a start of transmission of video data from the A-NDR 7 to the video-recording server 9 of the embodiment in FIG. 1.

In FIG. 8, Process 8001 shows the processing to be performed through the A-NDR 7 in the train, and Process 8002 shows the processing to be performed through the server 9 installed on the station side. It is assumed that, at a time point 8003, the train arrives at the station, and the wireless LAN line 10 is established. The server 9 issues a "transmission preparation command" to the archive NDR at a time point 8004. At this moment, the server 9 transmits a time range 8005, a transmission order 8006, and a priority order 8007. In the time range 8005, the server 9 instructs "transmission range the oldest time" showing the transmission range, and "transmission range the latest time". It may be able to instruct "oldest time" and "latest time" by means of a time, and to specify the values stored on the train side. Here, a value meaning "up to the present time after the time when the train has transmitted the last video data" is given.

At transmission order 8006, the server 9 instructs transmission order of clips. The clips may be transferred in time order, and may be transferred in importance order. Here, the server 9 instructs "level of importance order". At priority order 8007, the server 9 instructs priority order of video transmission processing. Here, "the highest priority" is instructed.

In Process 8008, since the priority order 8007 of the argument is "the highest priority", the A-NDR 7 interrupts the acquisition of the video data from the NDR 4. In Process 8009, since the priority order 8007 of the argument is "the highest priority", the A-NDR 7 interrupts the transmission of the video data to the PC 5. In Process 8010, since the A-NDR 7 interrupts the acquisition of the video data from the NDR 4, the server 9 generates the end information as current generation clip information of each camera recording area are shown in FIGS. 4, 5.

In Process 8011, since the transmission order 8006 of the argument is "level of importance order", the A-NDR 7 collects to sort the clip information, and generates the clip transmission order 75, as shown in FIG. 6.

In Process 8012, the A-NDR 7 transits a value of "agreement" showing the completion of preparation, the number of cameras 8013, and a video data size 8014 corresponding to the transmission range of each camera as information of the whole of the video data to be transmitted to the server 9. In Process 8015, the server 9 generates a directory for the train as creation of a video-recording area for the train to generate a video data file for each camera by the video data size 8014. In Process 8016, the server 9 issues a transmission start command to the A-NDR 7. After Process 8017, the A-NDR 7 transmits the video data for each block composed of each clip in accordance with the clip transmission order 75.

Next, the flow of processing in a case, in which the train departs and the wireless communication passage has been shut down during transmission of the video data from the A-NDR 7 to the server 9, will be explained with reference to FIG. 9.

Figure 9:
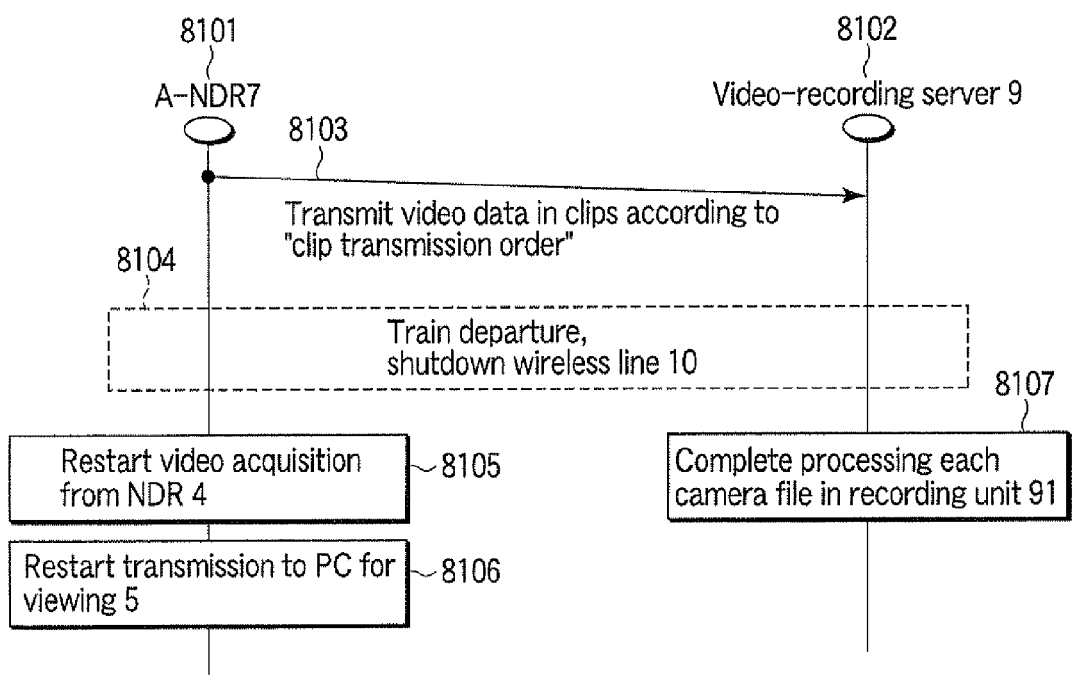
FIG. 9 is an exemplary sequence view depicting a flow of processing in a case where a train departs and a wireless communication path is shut down during a transmission of the video data from the A-NDR 7 to the video-recording server 9 of the embodiment depicted in FIG. 1.

In FIG. 9, Process 8101 shows A-NDR 7 processing in the train, and Process 8102 shows processing of the video-recording sever 9 installed on the station side. At a time point 8103, it is assumed that the A-NDR 7 is in transmission of the video data for each block composed of each clip in accordance with the clip transmission order 75. It is assumed that at the time point 8104, the train departs, the wireless line 10 is disconnected, and the communication is brought into a disabled state. The A-NDR 7 restarts the interrupted transmission of the video data from the NDR 4 in Process 8105. The A-NDR 7 restarts the interrupted transmission of the video data to the PC 5 in Process 8106. The server 9 waits for the arrival of the next train after changing the file size of file 921 for each camera into a size of actual acquisition to create the index file 931 as the completion processing of the video data acquisition from the A-NDR 7.

If the transfer of the video data within the transfer section range in a stop period has completed, the A-NDR 7 restarts the video acquisition from the NDR 4 to record the video data, and, at the same time, transmits the video data to the server 9.

The following will describe, with reference to FIG. 10, the flow in a case in which the transmission of the video data of the description in the clip transmission order 75 has completed during the stop of the train.

In FIG. 10, Process 8201 shows A-NDR 7 processing in the train, and Process 8202 shows processing by means of the server 9 installed on the station side. At a time point 8203, it is assumed that the A-NDR 7 has been transmitting the video data for each block composed of each clip in accordance with the clip transmission order 75. It is assumed that, at a time point 8204, the transmission of the video data of all the clips which have their turn of 75-th have been completed is completed. The A-NDR 7 then issues "transmission completion report" showing the completion of the transmissions to the server 9. In Process 8205, the A-NDR 7 restarts the interrupted acquisition of the video data from the NDR 4. The A-NDR 7 restarts the interrupted transmission of the video data to the PC 5 in Process 8206. In Process 8207, the server 9 issues "transmission preparation command" to the A-NDR 7. At this moment, the server 9 transmits a time range 8208, transmission order 8209, and priority order 8201 as arguments. After completion of the transmission of the video data of the train during traveling, the server 9 transmits the video data during the stop at the current station.

The time range 8208 adds a vale meaning "after the last transmission, until the communication is disconnected". The transmission order 8209 then instructs "old order". The priority order 8210 instructs "ordinary". "Ordinary" means making the A-NDR 7 transmit the video data to the server 9 while the A-NDR 7 performs the video acquisition from the NDR 4.

In process 8211, the A-NDR 7 transmits a value of "agreement" showing the completion of the preparation to the server 9. In Process 8212, the server 9 extends around 3 minutes of a full size of a recording file for each camera. At Process 8213, the server 9 issues a transmission start command to the A-NDR 7. Form a time point 8214 up to a time point in which the acquisition of the video data from the NDR 4 has stored by a volume of one clip, the A-NDR 7 transmits the video data to the server 9. It is assumed that, at a time point 8215, the train departs, the communication line 10 is disconnected, and the system is brought into an incommunicable state. The server 9 waits for the arrival of the next train after changing the file size of the file for each camera 921 into an actual acquisition size to create the index file 931 as completion processing of the acquisition of the video data from the A-NDR 7.

While the embodiment given above has been described in the case between the trains that is a mobile body and the wireless fixed station at the railway station, the invention may be applied to the case of transmission and reception of video data between the mobile bodies.

When the A-NDR 7 receives the transmission preparation command from the server 9, and when the server 9 arrives at a platform to be a communicable state, the server 9 issues the transmission start command to the A-NDR 7. The server 9 installed in the railway station gives an argument meaning "transmit the video data recorded after the passing though the railway station from which the last video data has been transferred". When the server 9 installed at the car base station acquires the video data during traveling in that day, the server 9 gives an argument meaning "transmit the video data recorded after xx o'clock".

Figure 4B:
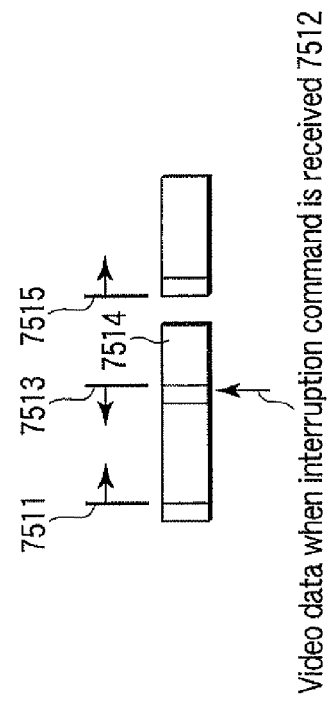

When receiving the transmission command of the video data from the server 9, the A-NDR 7 interrupts the acquisition of the video data from the NDR 4 to generate end information in the clips under currently creation as shown in FIGS. 4A, 4B, 5.

According to the configuration given above, since the current video-recording is not affected even during high-rate transfer of the video data, the risk of a failure in video-recording may be avoided. Especially, since the transfer of the video data from the train to the railway station at the stop station is performed between the A-NDR 7 and the server 9 and any access to each NDR 4 does not occur, the video reception from the IP camera 3 of each NDR 4 may be implemented smoothly. Even if the transfer of the video data is in time within the stop period, since the video with highly ranked importance such as a video immediately before this stop is preferentially transferred, and the video with low-ranked importance such as a video having no motion, a part of the video with the highly ranked importance may be stored in the server 9, and the monitoring system may maintain the monitoring ability in a necessary and sufficient state.

Additionally, although depending on the structure, the first video recording apparatus (NDR 4) may be installed within the camera 3.

While the foregoing embodiment has been described in the case where the video data is required for each one frame unit, for example, even if in the MPEG 4 type, the video data is required for each GOV unit to be video-recorded by using GOV numbers. It goes without saying that even if in any case other than that of the above; in a case of request for the video data in prescribed units, a prescribed number may be used for the request.

While the invention has been described in detail on the basis of the foregoing embodiments, the invention is not limited to the in-train video monitoring system described herein; the invention can be widely applied to a video recording system other than those given above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video-recording and transfer apparatus being mounted on a train of railway cars, video-recording video data from one or more imaging devices, and transferring the video data outside the train, comprising:
   one or more first video-recording devices which perform full-time video-recording or alarm video-recording through sensor detection of video data from the one or more imaging devices;
   a second video-recording device which receives the video data from the first video-recording devices and records the video data at a rate higher than an acquisition rate of the video data from the imaging devices;
   a communication device which determines property of a communication to and from the outside of the train to establish a wireless communication path to a partner communication device in a communicable state; and
   a control device which reads the recorded video data from the second video-recording device to transfer the video data to the partner communication device through the wireless communication path when the wireless communication path is established by the communication device, wherein
   the second video-recording device ranks each video data in order of importance for video-recording the video data from the first video-recording devices; and
   the control device transfers the video data in descending order of importance to the partner communication device,
   wherein:
   the communication device establishes the communication path for every stop of the train at a station, and
   the control device transmits the video data to the partner communication device installed in the station, and
   when the train departs from the station, the control device stops the transfer, the communication device disconnects the communication path, and the second video-recording device restarts recording the video data from the first video-recording device, at the interrupted portion of the video data.

2. The apparatus according to claim 1, wherein the second video-recording device manages video data in the unit of clips of one section or one alarm in which the video data is sectioned from the first video-recording devices at prescribed intervals or per alarm as each clip, and ranks the clips in order of importance of the clips.

3. The apparatus according to claim 2, wherein: the first video-recording device comprises circular storage areas for recording the video data for the imaging devices, respectively, each of the circular storage areas is formed to comprise a plurality of blocks of sufficiently greater fixed length than unit video data, and the video data is recorded in each of the circular storage areas together with information for determining whether the alarm video-recording is performed in response to the sensor;
   the second video-recording device manages the video data in unit of the clip that is one or more blocks of video data, sections the clip at a first change of the block after a prescribed time from a leading portion of the clip, at the interruption, or at a section of the alarm video-recording and, when there is a difference between a time of latest video data recorded in the first video-recording device and a time of latest video data recorded in the second video-recording device, creates clip information including an importance and a clip time for each clip while receiving older data of the video data in the difference, and deletes the clip information at a portion where the video data is erased by overwriting, and the importance causes the imaging devices to have a difference in accordance with an initial value set for each of the imaging devices and the information for determining; and
   when a time range of the transferred video data is designated by the partner communication device, the control device performs transferring in unit of the clip in a transferring order determined in accordance with the time range and the importance from all elements of the clip information.

4. The apparatus according to claim 2, wherein: the first video-recording devices are installed on each train of the railway cars, and the communication device is installed in a leading train or tail train of the railway cars and uses a millimeter radio wave as the communication path;
   a time of the video data is held at a header of the block used in each of the first video-recording devices;
   the second video-recording device performs recording in a circular storage area by an assembly of blocks having the same structure as a structure in the first video-recording devices;
   the control device transfers the video data in the clip in unit of the blocks and, when the transfer performed by interrupting the recording of the video data from all of the first video-recording devices is completed, and causes the second video-recording device to restart the recording of the video data from the first video-recording devices and then, when the control device receives an transmission instruction in a general priority order from the partner communication device, the control device, every time a clip of the video data acquired from each of the first video-recording devices is stored after the restarting, the control device continues transferring the clip to the partner communication device until the communication path is disconnected.

5. The apparatus according to claim 1, wherein the second video-recording device changes calculation procedures of the importance based on a place of the respective imaging devices.

6. The apparatus according to claim 1, wherein the control device decides the transfer order of clips being ranked with the same importance by transferring the video data in order of newness in acquisition time of the video data which has been newly transmitted if both of the importance ranks are the same.

7. The apparatus according to claim 1, wherein during the transfer to the partner communication device, the second video-recording device interrupts the receiving from the first video-recording devices; and the importance of the video data from a prescribed arrival time of the train at a station to a prescribed departure time of the train from the station is highly ranked.

8. The apparatus according to claim 7, wherein the first video-recording devices are installed in each car in which at least one imaging device is mounted, the second video-recording device and the control device is installed in a top car, tail car, or a car having crew cabin, all the first video-recording devices and second video-recording devices are connected by a inter-car LAN.

9. A video-recording and transfer method for video-recording video data from a video-recording and transfer apparatus being mounted on a train of railway cars, video-recording video data from one or more imaging devices, and transferring the video data outside the train, comprising:
  taking in the video data from the one or more imaging devices to perform full-time video-recording or alarm video-recording into one or more first video-recording devices;
  transferring the video-recorded video data from the first video-recording device to record the video data in a second video-recording device at a rate higher than an acquisition rate of the video data from the imaging devices;
  determining property of a communication to and from the outside of the train to establish a wireless communication path to a partner communication device in a communicable state;
  reading the recorded video data from the second video-recording device to transfer the video data to the partner communication device through the wireless communication path when the wireless communication path is established by the communication device;
  ranking each video data in order of importance for video-recording the video data from the first video-recording devices into the second video-recording device;
  transferring the video data in descending order of importance to the partner communication device;
  establishing the communication path for every stop of the train at a station;
  transmitting the video data to the partner communication device installed in the station; and
  when the train departs from the station, stopping the transfer by disconnecting the communication path, and restarting recording the video data from the first video-recording device, at the interrupted portion of the video data.

10. The method according to claim 9, wherein the ranking in order of importance, managing the video data in the unit of clips of one section or one alarm, in which the video data from the first video-recording device is sectioned at prescribed intervals or per alarm, as each clip.

11. The method according to claim 9, further comprising:
  changing calculation procedures of the importance based on a place of the respective imaging devices.

12. The method according to claim 9, further comprising:
  deciding the transfer order of clips of the video data being ranked with the same importance in order of newness in acquisition time of the video data which has been newly transmitted if both of the importance ranks are the same.

13. The method according to claim 9, wherein during the transfer to the partner communication device, the second video-recording device interrupts the receiving from the first video-recording devices; and
  the importance of the video data from a prescribed arrival time of the train at a station to a prescribed departure time of the train from the station is highly ranked.

* * * * *